United States Patent
Denny et al.

(10) Patent No.: US 8,457,290 B2
(45) Date of Patent: *Jun. 4, 2013

(54) METHOD, APPARATUS, AND COMPUTER PROGRAM PRODUCTS FOR PROVIDING DYNAMIC REPLACEMENT COMMUNICATION IDENTIFICATION SERVICE

(75) Inventors: Michael Denny, Sharpsburg, GA (US); Hong Nguyen, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,371

(22) Filed: Aug. 17, 2012

(65) Prior Publication Data

US 2012/0307992 A1  Dec. 6, 2012

Related U.S. Application Data

(63) Continuation of application No. 12/139,083, filed on Jun. 13, 2008, now Pat. No. 8,275,104.

(51) Int. Cl.
*H04M 1/56* (2006.01)
*H04M 15/06* (2006.01)

(52) U.S. Cl.
USPC ............. 379/142.09; 379/142.04; 379/142.17

(58) Field of Classification Search
USPC ............. 379/142.01, 142.05, 142.06, 142.09, 379/142.17, 229, 230, 142.04
See application file for complete search history.

(56) References Cited

U.S. PATENT DOCUMENTS

| | | |
|---|---|---|
| 5,590,184 A | 12/1996 | London |
| 5,864,612 A | 1/1999 | Strauss et al. |
| 5,901,209 A | 5/1999 | Tannenbaum et al. |
| 5,953,399 A | 9/1999 | Farris et al. |
| 6,343,120 B1 | 1/2002 | Rhodes |
| 6,662,006 B2 | 12/2003 | Glass |
| 6,771,755 B1 | 8/2004 | Simpson |
| 7,099,445 B2 | 8/2006 | Creamer et al. |
| 7,197,300 B2 * | 3/2007 | Kushita .................. 455/418 |
| 7,551,731 B2 | 6/2009 | Durga et al. |
| 7,995,727 B1 | 8/2011 | Chmara et al. |
| 2002/0067816 A1 | 6/2002 | Bushnell |
| 2009/0310766 A1 * | 12/2009 | Ye .......................... 379/142.17 |

OTHER PUBLICATIONS

Wikipedia, "Caller ID", pp. 1-5, retrieved from webpage http://en.wikipedia.org/wiki/Caller_ID; on Sep. 13, 2007.
Wikipedia, "Caller ID Spoofing," pp. 1-4, retrieved from webpage http://en.wikipedia.org/wiki/Caller_ID_spoofing; on Jun. 13, 2008.

* cited by examiner

*Primary Examiner* — Binh Tieu
(74) *Attorney, Agent, or Firm* — Cantor Colburn LLP

(57) ABSTRACT

Methods, apparatus, and computer program products provide dynamic replacement communication identification (ID) service. A request is received from a user for dynamic replacement communication ID from a current location of the user. The user requesting dynamic replacement communication ID is authenticated. A user profile of the user requesting dynamic replacement communication ID is retrieved. A current profile of the current location is replaced with the user profile of the user.

20 Claims, 5 Drawing Sheets

METHOD, APPARATUS, AND COMPUTER PROGRAM PRODUCTS FOR PROVIDING DYNAMIC REPLACEMENT COMMUNICATION IDENTIFICATION SERVICE

This application is a continuation of U.S. Non-Provisional application Ser. No. 12/139,083, entitled "METHODS, APPARATUS, AND COMPUTER PROGRAM PRODUCTS FOR PROVIDING DYNAMIC REPLACEMENT COMMUNICATION IDENTIFICATION SERVICE", filed Jun. 13, 2008, which is incorporated herein by reference in its entirety.

BACKGROUND

Exemplary embodiments relate generally to communications, and more particularly, to communications utilizing caller identification.

Caller identification (also known as caller ID, CID, or calling number identification) is a service, available, e.g., on POTS (plain old telephone service) line, that transmits a caller's number to the called party's telephone equipment during the ringing signal, or when the call is being set up. Where available, caller ID can also provide a name associated with the calling telephone number. The information made available to the called party may be made visible on a telephone's own display or on a separate attached device.

Caller ID is often helpful for tracing prank calls and other unwanted intrusions. The concept behind caller ID is the value of informed consent. However, it can also impede communication by enabling the user to become evasive.

Many times the called party views the caller ID before answering the telephone, and when the number or name is not recognized, the called party does not answer the phone. However, in some cases, the person calling may actually be someone that the called party would recognize but the person calling is at a different telephone from his/her home telephone.

A need exists for a mechanism by which the called party can recognize the calling party even if the calling party is calling from a different telephone (or communication device, e.g., a PDA or a computer).

BRIEF SUMMARY

Exemplary embodiments include a method for dynamic replacement communication identification (ID) service. A request is received from a user at a current location of the user for dynamic replacement communication ID. A user requesting dynamic replacement communication ID is authenticated. A user profile of the user requesting dynamic replacement communication ID is retrieved. A current profile of a current location is replaced with the user profile of the user.

Additional exemplary embodiments include a dynamic calling apparatus for dynamic replacement communication identification (ID) service. Memory stores a program for providing dynamic replacement communication ID. A processor is functionally coupled to the memory. The processor is responsive to computer-executable instructions contained in the program and operative to receive a request to invoke replacement calling ID services from a first communications device, where the first communications device is at a current location. The processor is operative to authenticate the request to invoke replacement calling ID services from the first communications device, retrieve a user profile of a user of the first communications device, and provide the user profile of the user in place of a current profile of the current location.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments provide dynamic caller ID services, by which a calling party can provide his/her identification information, such as name and telephone number, even if placing a call from a different telephone or other communication device that is normally associated with the caller. In the description that follows, for illustrative purposes, a "call" and a "caller ID" are described with reference to a telephone call identification information associated with a caller's telephone. However, it should be appreciated that a "call" is not limited to a telephone call but may be any communication, e.g., a communication across a packet-switched VoIP network, and the "caller ID" may identify the communication device associated with a particular user. Further details regarding communications in a VoIP network are provided below.

Referring to a telephone call as an example, a calling party may be over at friend's house and need to use the friend's telephone. When a call is normally placed from the friend's telephone, the caller ID information would be the information of the friend. Accordingly, the friend's name and/or telephone number would appear on the caller ID screen of the called party.

However, exemplary embodiments provide a mechanism by which a replacement name and/or telephone number (or other identifying information) can appear on the caller ID screen of the called party. For example, the calling party using the friend's telephone may pick up the telephone and dial, e.g., *23. By dialing *23, the calling party invokes a replacement telephone calling ID service. The calling party may be prompted to enter his/her real telephone number (or the calling party could enter a username) and then a password. After being authenticated, the calling party may be prompted to dial the telephone number of the party in which he/she desires to call. When the caller ID screen would normally display the telephone number and name of the friend, the caller ID screen of the called party now displays the replacement telephone number and/or name that belongs to the person who invoked the replacement telephone calling ID service. Instead of the called party receiving the unrecognized telephone number and name of the friend, the called party receives the replacement telephone number and name that the called party recognizes.

Figure 1:
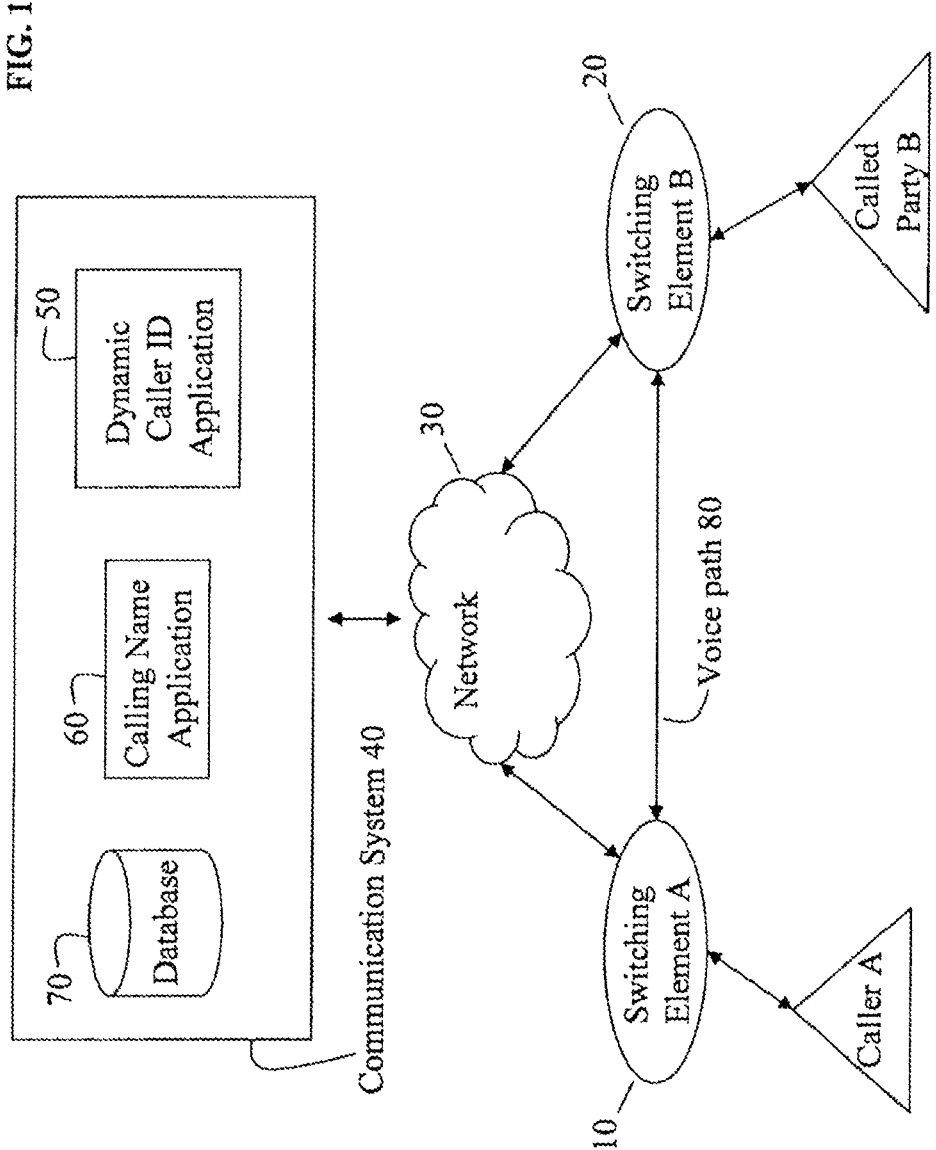
FIG. 1 illustrates an example of a system in which dynamic caller ID services may be implemented in accordance with exemplary embodiments.

Now turning to FIG. 1, FIG. 1 illustrates an example of a system in which dynamic caller ID services may be implemented in accordance with exemplary embodiments.

For a telephone call using existing techniques, a caller A dials the telephone number for a called party B, and a switching element 10 rings the called party B via a switching element 20. The switching element 20 receives the telephone number from which the call was placed and launches a query to a calling name application 60 in a communication system 40, so that the calling name application 60 will return the corresponding name via a network 30. The calling name application 60 uses, e.g., the telephone number from which the call was placed to perform a look up for the corresponding name in a database 70. Once the name is found by the calling name application 60, the calling name application 60 provides the switching element 20 with the name that corresponds with the telephone number. The switching element 20 provides the telephone number and name to the caller ID display of the called party B. In certain telephone networks, when the called party B answers the ringing telephone, a dedicated voice path 80 is used for the caller A to talk to the called party B.

In a scenario in which the caller A knows the called party B, and the called party B recognizes the telephone number and name of the location in which the telephone call was placed, the called party B would answer the telephone. For a case when the caller A is not at his/her home telephone, a different telephone number and name will appear on the caller ID display of the called party B. For example, the caller A may be at a friend's home and desires to call the called party B. In this case, the called party B may not recognize the friend's name and telephone number on the caller ID display, although the caller A is calling.

However, in accordance with exemplary embodiments, the caller A may invoke dynamic caller ID services such that caller A's information (e.g., home information or cell phone information) will be displayed on the caller ID display of the called party B in place of or along with the friend's information. There are many ways in which the dynamic caller ID services may be invoked in exemplary embodiments. For example, the caller A may pick up the telephone (e.g., turn the telephone on), and press a series of buttons, such as *23, to invoke the dynamic caller ID services. Also, the caller A may state certain voice commands to invoke the dynamic caller ID services, and the telephone can enter *23.

In response to invoking the dynamic caller ID services, the switching element 10 connects the friend's telephone via the network 40 to a dynamic caller ID application 50 of the communication system 40. The communication system 40 may include a plurality of servers on which the dynamic caller ID application 50, the calling name application 60, and the database 70 reside. It is understood that servers may include one or more processors, input/output devices, and memory. The switching element 10 (and/or the dynamic caller ID application 50) recognizes that the caller A has requested dynamic caller ID services. The switching element 10 routes the request to invoke dynamic caller ID services to the dynamic caller ID application 50.

The caller A may be prompted to input his/her personal telephone number or other identifying information by the dynamic caller ID application 50. For example, the caller A may hear a special dial tone (e.g., 5 short beeps), a special ring (e.g., 3 long rings), and/or a message indicating "dynamic caller ID services are activated for this call". As part of a challenge by the dynamic caller ID application 50, the caller A may be prompted to input a password. Also, in exemplary embodiments, the caller A may input his/her telephone number and password without being with prompted. Additionally or alternatively, the caller A may enter *23, enter his/her telephone number, and enter his/her password without any prompting.

The dynamic caller ID application 50 receives the telephone number and password of the caller A. Using the telephone number and password input by the caller A, the dynamic caller ID application 50 authenticates the caller A.

The dynamic caller ID application 50 may instruct the calling name application 60 to look up the name that corresponds with the telephone number input by the caller A. The calling name application 60 may look up the telephone number in the database 70 to find the corresponding name of the caller A. The calling name application 60 provides the corresponding name to the dynamic caller ID application 50. The dynamic caller ID application 50 has the actual name and telephone number for the caller A, even though the caller A is using a friend's telephone to place the call to the called party B.

In response to the caller A inputting the telephone number of the called party B, the dynamic caller ID application 50 provides the name and telephone number of the caller A to the caller ID display of the called party B (via the switching element 20). The switching element 20 may still query the calling name application 60 to obtain the friend's name.

The switching element 20 may suppress the friend's name and telephone number but provide the caller A's name and telephone number to the called party B.

Figure 2:
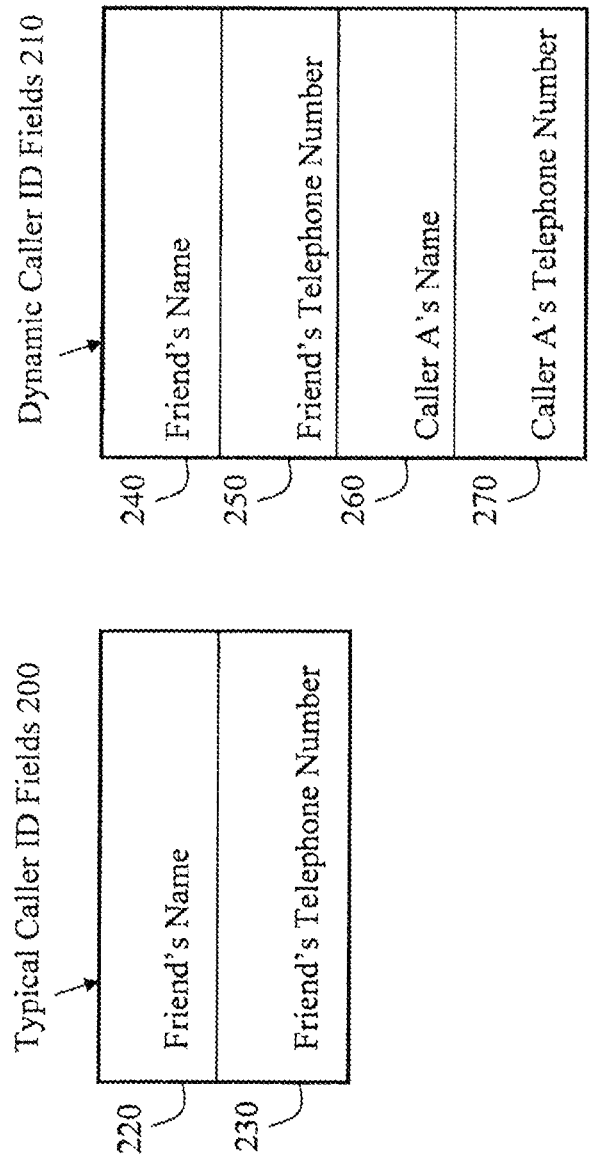
FIG. 2 illustrates an example of typical data fields compared to data fields using dynamic caller ID services in accordance with exemplary embodiments.

FIG. 2 illustrates an example of typical data fields compared to data fields using dynamic caller ID services in accordance with exemplary embodiments.

Typical caller ID fields 200 illustrate what is normally provided to a caller ID device for display via the switching element 20. Placing a typical call from the friend's house may include the friend's name in a field 220 and the friend's telephone number in a field 230.

Dynamic caller ID fields 210 are illustrated in accordance with exemplary embodiments. When dynamic caller ID services are invoked, the dynamic caller ID fields 210 may include the friend's name in a field 240 and the friend's telephone number in a field 250. According to an exemplary embodiment, unlike the typical caller ID fields 200, the dynamic caller ID fields 210 also include the caller A's name in a field 260 and the caller A's telephone number in a field 270. In exemplary embodiments, the fields 260 and 270 are provided to the called party B so that the called party B knows that the caller A is calling. For example, the fields 240 and 250 containing the friend's information may be suppressed, so as not to be displayed on the caller ID of the called party B. Although the fields 240 and 250 are not displayed for the purposes of caller ID, the friend's information is not deleted and is still available for accounting purposes (such as logging incoming calls and charging long distance fees).

The switching element 20 may check to see if the data fields 260 and/or 270 are present. In response to the data fields 260 and/or 270 being present, the switching element 20 will provide the called party B with caller ID information from the data fields 260 and 270 to be displayed. Otherwise, if the data fields 260 and 270 are not present, the switch element 20 will provide the called party B with caller ID information from the data fields 240 and 250.

Although two separate fields are illustrated in FIG. 2 to show the name and the telephone number, it is understood that a single data field may include both the name and telephone number. Also, there may be more fields showing identifying information of the caller, as well as field showing different identifying information.

In accordance with exemplary embodiments, the caller A may register for dynamic caller ID services in advance. The caller A may set up a profile. The caller A may select a means of identification so that the dynamic caller ID application 50 can recognize and authenticate the caller A when dynamic caller ID services are invoked. For example, a password or biometric information (such as voice recognition, a thumb print, a scan of the user's eye, etc.) may be used to authenticate the user.

The dynamic caller ID services can be applied with any type of communication system that uses caller ID. For example, the dynamic caller ID services can be implemented in wireless communication systems with cellular telephones and, as noted above, can be implemented in voice over Internet protocol (VoIP) systems.

Figure 3:
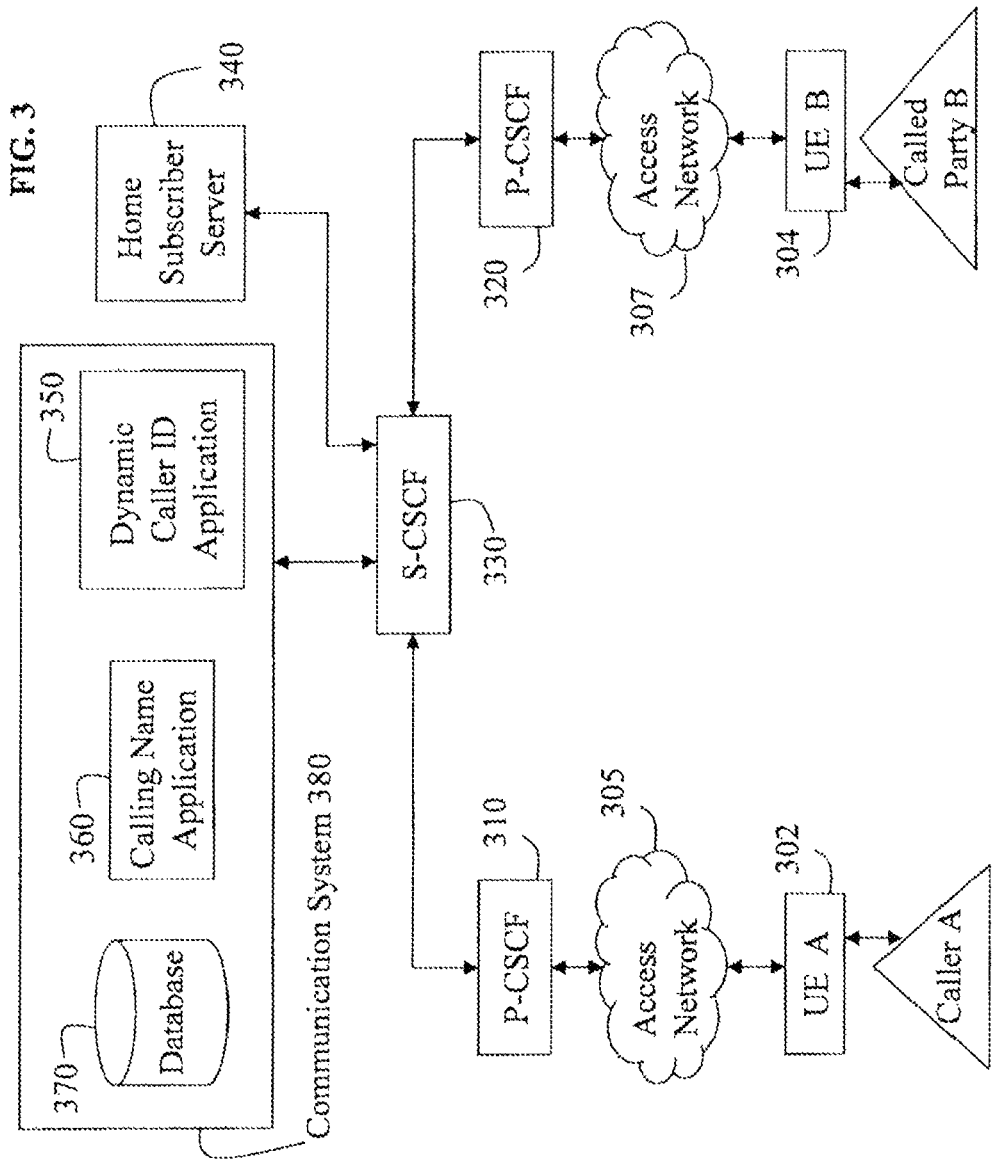
FIG. 3 illustrates an example of an IP multimedia system (IMS) implementing dynamic caller ID services in accordance with exemplary embodiments.

FIG. 3 illustrates an example of an IP multimedia system (IMS) implementing dynamic caller ID services in accordance with exemplary embodiments. The IP multimedia system is an architectural framework for implementing real time services such as voice call processing over the Internet protocol. One skilled in the art understands the various elements in IMS.

The calling party A has user equipment (UE) 302 for connecting to an access network 305. The access network 305 accesses a P-CSCF (proxy call session control function) 310. Likewise, the called party B has UE 304 for connecting to an access network 307. The access network 307 accesses a P-CSCF 320. With respect to dynamic caller ID services, the P-CSCF 310 and the P-CSCF 320 may be likened to the switching element 10 and the switching element 20, respectively.

Also, a Home Subscriber Server (HSS) 340 may be included. The HSS 340 is a master user database that supports the IMS network entities that actually handle calls. The HSS 340 contains the subscription-related information (user profiles), performs authentication and authorization of the user, and can provide information about the user's physical location. Although the HSS 340 is shown separate from a communication system 380, the HSS 340 may optionally be included in the communication system 380.

Following the earlier example above, the calling party A is utilizing a friend's user equipment, such as the UE 302, to place a call but desires to invoke dynamic caller ID services. The caller A may input *23 to invoke dynamic caller ID services. Within the communication system 380, a dynamic caller ID application 350 receives the notice that dynamic caller ID services are being invoked via a S-CSCF (serving call session control function) 330. The user, such as the calling party A, inputs a password which is authenticated by the dynamic caller ID application 350. The caller A inputs his/her actual telephone number, and the dynamic caller ID application 350 instructs a calling name application 360 to perform a look up in a database 370 using the input telephone number. The look up by the calling name application 360 returns the caller A's name that will be substituted for the friend's name.

The caller A now places the call to the called party B by entering the called party's telephone number. The P-CSCF 320 may check whether replacement caller ID information is provided. In response to receiving the replacement caller ID information, the P-CSCF 320 provides caller A's name and/or telephone number to the caller ID display of the UE 304. Accordingly, by seeing the caller ID information for caller A (and not the friend's caller ID information), the called party B recognizes that the caller A is calling.

More, regarding a P-CSCF in general, the P-CSCF is a session initiation protocol (SIP) proxy that is the first point of contact for the IMS terminal. The P-CSCF can be located either in the visited network or in the home network. The terminal discovers its P-CSCF with either dynamic host configuration protocol (DHCP), or it is assigned in the packet data protocol (PDP) context. The P-CSCF is assigned to an IMS terminal during registration, and does not change for the duration of the registration. The P-CSCF sits on the path of all signaling messages, and can inspect every message. The P-CSCF authenticates the user and establishes an IP security association with the IMS terminal, and can also compress and decompress SIP messages.

More, regarding a S-CSCF in general, the S-CSCF is the central node of the signaling plane and is a SIP server, but performs session control too. The S-CSCF handles SIP registrations, which allows the S-CSCF to bind the user location (e.g., the IP address of the terminal) and the SIP address. The S-CSCF sits on the path of all signaling messages, and can inspect every message, and the S-CSCF also decides to which application server(s) the SIP message will be forwarded, in order to provide their services.

Indeed, it is understood that numerous systems can implement the dynamic caller ID services according to exemplary embodiments. For example, the caller A may be calling from a cellular telephone, wired telephone, soft telephone on a computer, and/or VoIP telephone. Likewise, the called party B may receive the call using a cellular telephone, wired telephone, soft telephone on a computer, and/or VOIP telephone. Therefore, the examples and systems discussed herein are for illustrative purposes and are not meant to be limiting. Further, although the caller ID information over a VoIP network can be the same as traditional caller ID, VoIP telephones have an associated 10 digit telephone number as well as an IP address. The telephone number is specified as part of the TelURL identity specified for IMS end devices.

Figure 4:
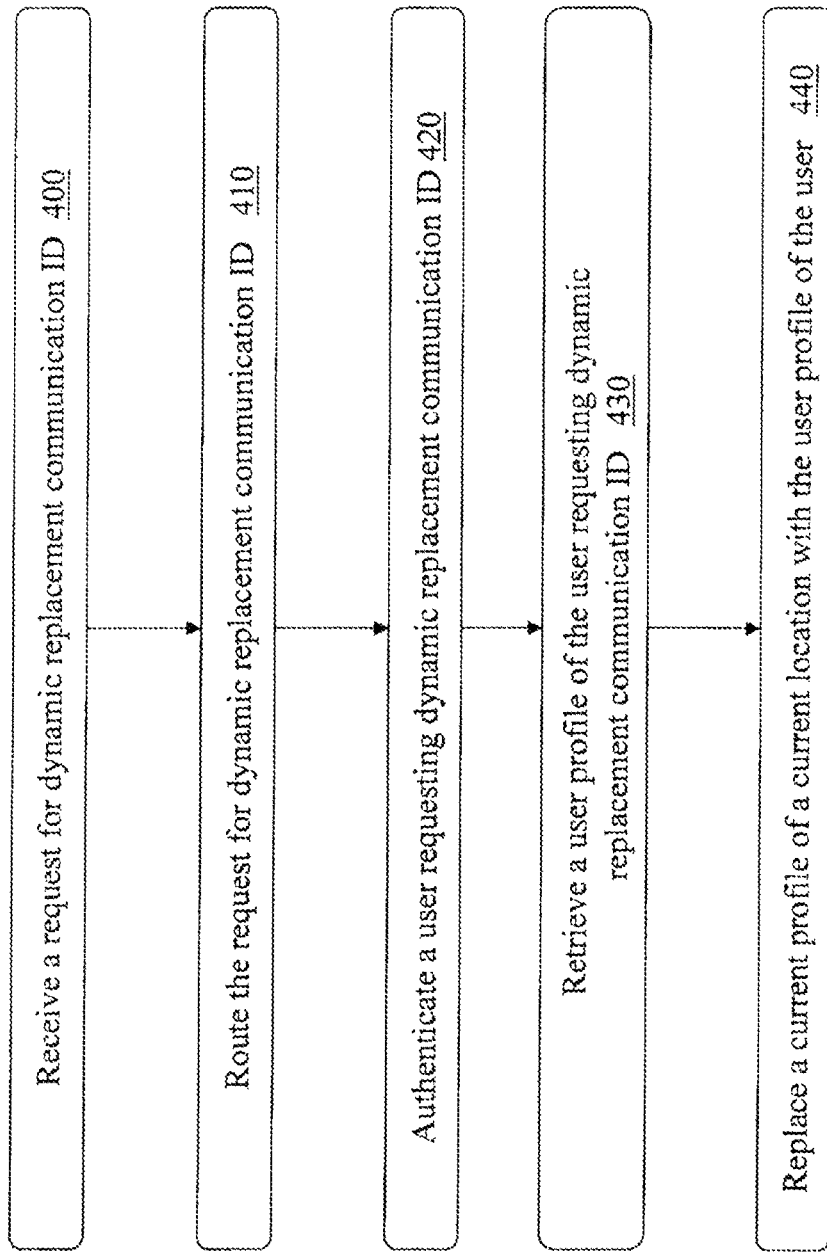
FIG. 4 illustrates a method for dynamic caller ID services in accordance with exemplary embodiments.

FIG. 4 illustrates a method for providing dynamic caller ID services in accordance with exemplary embodiments. A request for dynamic communication ID services is received at 400. For example, the caller A may input *23 and his/her telephone number to request the services.

The request for dynamic communication ID is routed at 410. For example, the request from the caller A may be routed from the switching element 10 to the dynamic caller ID application 50.

A user requesting dynamic communication ID is authenticated at 420. In response to receiving the correct password, the caller A may be authenticated (verified) by the dynamic caller ID application 50.

A user profile of the user requesting dynamic communication ID is retrieved at 430. The calling name application 60 can retrieve the user's name (or any other information) from the database 70 or from the home subscriber server 340.

The switching element 20 (or the dynamic caller ID application 50) can replace a current profile of a current location with the user profile of the user at 440.

Further, in exemplary embodiments, the user profile of the user may include a name, a location, a telephone number, an email address, and an IP address corresponding to the user.

Moreover, a communication originating from the current location is connected to a destination party, and the destination party is provided with the user profile of the user in place of the current profile of the current location in which the communication originated.

Additionally, if the user placed a communication from a third communications device, having a third profile, at a third location to the destination party, the user profile of the user may be provided to the destination party in place of the third profile.

Also, receiving the invocation of the dynamic communication ID service may include receiving a sequence of numbers entered from a communications device, receiving an audible voice request, and receiving a code and a home telephone number.

Further, unlike caller ID spoofing that provides false information and has been deemed illegal, dynamic caller ID services provide actual verified information of the calling party to the called party. Also, dynamic caller ID services allow the calling party who has registered for dynamic calling ID services (in advance) to transport his/her identity to any location, when he/she places a telephone call, regardless of the telephone equipment being used. Dynamic caller ID services do not change the origin of the telephone call, but change the name of the person making the call.

Figure 5:
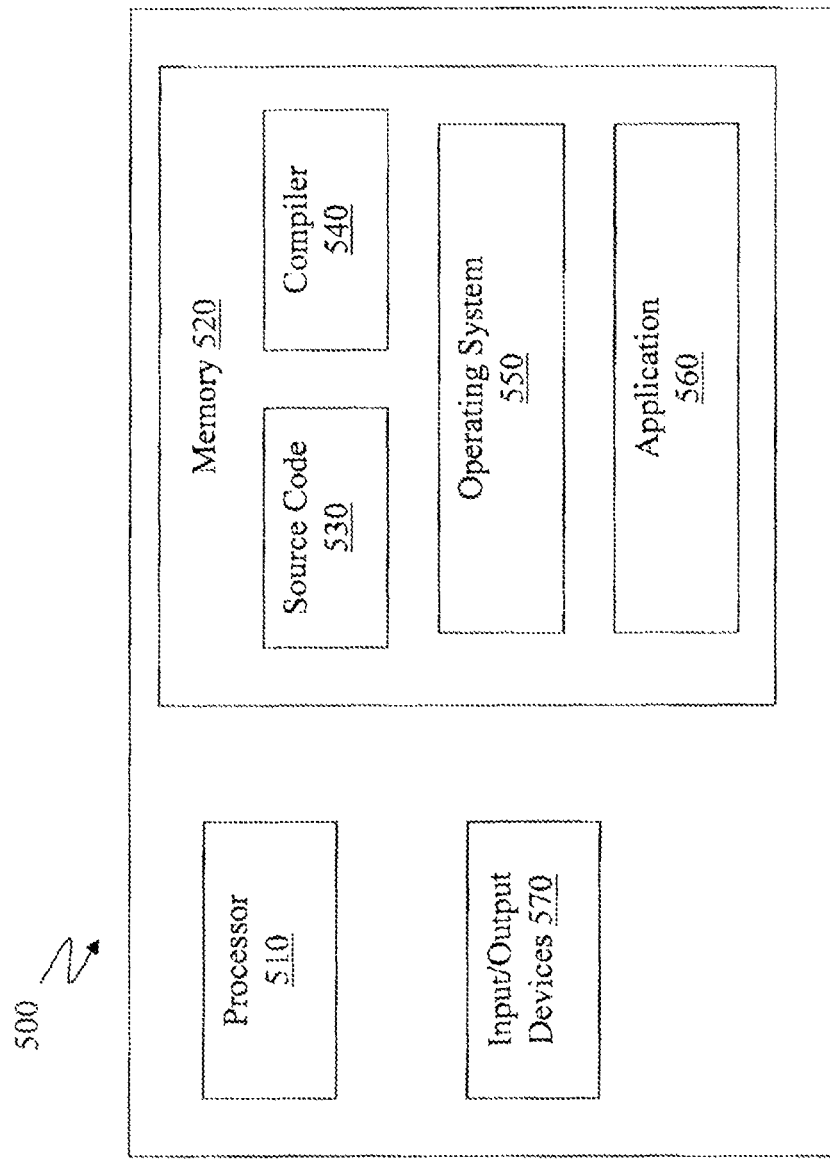
FIG. 5 illustrates an example of a computer having elements that may be used in implementing exemplary embodiments.

FIG. 5 illustrates an example of a computer 500 having elements that may be used in implementing exemplary embodiments. The computer 500 includes, but is not limited to, PCs, workstations, laptops, PDAs, palm devices, servers, mobile devices, and the like. The computer 500 may include a processor 510, memory 520, and one or more input and/or output (I/O) 570 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. In the example illustrated in FIG. 5, the software in the memory 520 includes a suitable operating system (O/S) 550, compiler 540, source code 530, and an application 560 of the exemplary embodiments.

The operating system 550 controls the execution of other computer programs, and provides scheduling, input-output control, file and data management, memory management, and communication control and related services. It is contemplated by the inventors that the application 560 for implementing exemplary embodiments is applicable on all other commercially available operating systems.

The application 560 may be a source program, executable program (object code), script, or any other entity comprising a set of instructions to be performed. When a source program is to be executed, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O 570 devices may include input devices such as, for example but not limited to, a mouse, keyboard, scanner, microphone, etc. Furthermore, the I/O 570 devices may also include output devices, for example but not limited to, a printer, display, etc. Also, the I/O 570 devices may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software, it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for dynamic replacement communication identification service, comprising:
    receiving a request for a dynamic replacement communication identification from a user at a current location which comprises receiving an invocation of the dynamic replacement communication identification service by receiving input of a star key followed by a sequence of numbers entered from a communications device, followed by a telephone number of the user, and followed by a password without any prompting;
    authenticating the user requesting the dynamic replacement communication identification;
    wherein the user registers in advance for the dynamic replacement communication identification service;
    retrieving a user profile of the user requesting the dynamic replacement communication identification;
    in a first case, replacing a current profile of the current location with the user profile of the user; and
    in a second case, adding the user profile of the user to be displayed along with the current profile of the current location in which the current profile of the current location is information of a friend.

2. The method of claim 1, wherein the user profile of the user comprises a name, a location, the telephone number, an email address, and an internet protocol address.

3. The method of claim 1, further comprising:
    connecting a communication originating from the current location to a destination party; and
    providing the destination party with the user profile of the user in place of the current profile of the current location from which the communication originated.

4. The method of claim 3, wherein connecting the communication originating from the current location to the destination party comprises placing a telephone call; and
    wherein the destination party is a called party.

5. The method of claim 4, wherein when the user places a communication from an other communications device, having an other profile, at an other location to the destination party, the user profile of the user is provided to the destination party in place of the other profile.

6. The method of claim 1, further comprising transmitting the user profile of the user, wherein the user profile of the user is provided for identification in place of the current profile of the current location.

7. The method of claim 1, wherein receiving the request for dynamic communication replacement identification comprises recognizing the invocation of the dynamic replacement communication identification service.

8. The method of claim 7, wherein receiving the invocation of the dynamic replacement communication identification service further comprises receiving an audible voice request from the user, and receiving a code and a home telephone number from the user.

9. A dynamic calling apparatus for providing dynamic replacement communication identification service comprises:
    memory for storing a program for providing a dynamic replacement communication identification; and
    a processor, functionally coupled to the memory, the processor being responsive to computer-executable instructions contained in the program and operative to:
        receive a request to invoke the dynamic replacement communication identification service from a first communications device utilized by a user, the first communications device being at a current location;

wherein receiving an invocation of the dynamic replacement communication identification service comprises receiving input of a star key followed by a sequence of numbers and receiving an audible voice request entered from the first communications device, followed by a telephone number of the user, and followed by a password without any prompting;

authenticate the request to invoke the dynamic replacement communication identification service from the first communications device;

wherein the user registers in advance for the dynamic replacement communication identification service;

retrieve a user profile of the user of the first communications device;

in a first case, provide the user profile of the user in place of a current profile of the current location; and in a second case, add the user profile of the user to be displayed along with the current profile of the current location in which the current profile of the current location is information of a friend.

10. The dynamic calling apparatus of claim 9, wherein the user profile of the user comprises a name, a location, the telephone number, an email address, and an internet protocol address.

11. The dynamic calling apparatus of claim 9, wherein in response to the first communications device placing a communication to a second communications device, the user profile is provided to the second communications device in place of the current profile of the current location from which the communication originated.

12. The dynamic calling apparatus of claim 11, wherein the communication from the first communications device to the second communications device is a telephone call.

13. The dynamic calling apparatus of claim 9, wherein when the request to invoke the dynamic replacement communication identification service is received from the first communications device, a code and a home telephone number are received.

14. The dynamic calling apparatus of claim 9, wherein a home telephone number of the user is received; and wherein the user profile of the user is retrieved based on the home telephone number of the user.

15. The dynamic calling apparatus of claim 9, wherein the user profile of the user is retrieved from a memory.

16. The dynamic calling apparatus of claim 9, wherein the user profile of the user is provided to a second communications device for identification of the user.

17. A computer program product, tangibly embodied on a computer readable medium, for dynamic replacement communication identification service, the computer program product including instructions for causing a computer to execute a method, comprising:

receiving a request for a dynamic replacement communication identification from a user at a current location;

wherein receiving the request for the dynamic replacement communication identification comprises receiving an invocation of the dynamic replacement communication identification service by receiving input of a star key followed by a sequence of numbers entered from a communications device, followed by a telephone number of the user, and followed by a password without any prompting;

authenticating the user requesting the dynamic replacement communication identification;

wherein the user registers in advance for the dynamic replacement communication identification service;

retrieving a user profile of the user requesting the dynamic replacement communication identification;

in a first case, replacing a current profile of the current location with the user profile of the user; and in a second case, adding the user profile of the user to be displayed along with the current profile of the current location in which the current profile of the current location is information of a friend.

18. The computer program product of claim 17, further comprising causing the computer to execute connecting a communication originating from the current location to a destination party; and providing the destination party with the user profile of the user in place of the current profile of the current location.

19. The computer program product of claim 18, wherein connecting the communication originating from the current location to the destination party comprises placing a telephone call.

20. The computer program product of claim 17, wherein the user profile of the user comprises a name, a location, the telephone number, an email address, and internet protocol address.

* * * * *